United States Patent
Möller

[11] Patent Number: 6,084,370
[45] Date of Patent: Jul. 4, 2000

[54] SWITCHING DEVICE FOR THE MANUAL DRIVE OF AN ELECTROMOTIVE ACTUATOR

[75] Inventor: Herbert Möller, Grosser Kamp, Germany

[73] Assignee: Hartman & Braun GmbH & Co. KG, Eschborn, Germany

[21] Appl. No.: 09/290,093

[22] Filed: Apr. 12, 1999

[30] Foreign Application Priority Data

Apr. 24, 1998 [DE] Germany ............................ 298 07 444

[51] Int. Cl.⁷ .................................................. G05B 11/18
[52] U.S. Cl. ........................ 318/560; 318/430; 251/129.11
[58] Field of Search ............................... 318/1, 500–696, 318/430–434; 251/30.01, 18, 25, 38, 71, 98, 99, 129.01–129.09, 129.11, 249.5; 74/625, 626; 137/487.5

[56] References Cited

U.S. PATENT DOCUMENTS

| | | | |
|---|---|---|---|
| 3,946,985 | 3/1976 | Fujita et al. ............................... | 251/130 |
| 4,429,591 | 2/1984 | Zuch et al. ................................. | 74/625 |
| 5,014,719 | 5/1991 | McLeod ..................................... | 128/774 |
| 5,024,124 | 6/1991 | Popov et al. ............................... | 74/625 |
| 5,130,625 | 7/1992 | Babel ........................................ | 318/560 |
| 5,152,317 | 10/1992 | Dorr .......................................... | 137/487.5 |
| 5,594,175 | 1/1997 | Lyon et al. ................................. | 73/593 |

*Primary Examiner*—Paul Ip
*Attorney, Agent, or Firm*—Michael M. Rickin

[57] ABSTRACT

The invention relates to a switching device for the manual drive of an electromotive actuator for the control of fittings. In order to connect the manual drive by means of few components, whilst ensuring a simple design, the operative connection between the drive motor and the power take-off being maintained during manual drive, a drive shaft stub of the axially fixed drive shaft is equipped with a radial coupling pin. The handwheel shaft is mounted axially displaceably and in alignment with the drive shaft. That end of the handwheel shaft which is located opposite the handwheel is equipped with a coupling sleeve displaceable axially counter to the force of a compression spring. That end of the coupling sleeve which faces the drive shaft has a groove, the entrance of which is widened on both sides by means of run-on slopes. The manual drive has means for operating an electric switch which is arranged in the circuit of the drive motor and which is closed in the state of rest of the manual drive and is open when the handwheel shaft is engaged.

6 Claims, 4 Drawing Sheets

SWITCHING DEVICE FOR THE MANUAL DRIVE OF AN ELECTROMOTIVE ACTUATOR

FIELD OF THE INVENTION

This invention relates to a switching device for the manual drive of an electromotive actuator for the control of fittings and more particularly to such devices which include a handwheel shaft and a handwheel which can be operatively connected to the fitting.

DESCRIPTION OF THE PRIOR ART

In actuators of this kind, an electric motor drives a fitting, which may be designed as a valve, flap, slide or the like, by a gear in order to adapt the actuating travel and actuating time to the particular requirement. Actuators of this kind are equipped with a manual drive for the purpose of operating the fitting in the event of a power failure or if the electric motor is damaged.

DE 42 39 947 discloses an actuator of this kind, with a variable-ratio planetary gear, in which, for manual drive, a worm shaft is provided. The worm shaft has a worm which engages into an external toothing of a ring wheel, inside of which are intermediate gearwheels of the motive drive mesh. The worm shaft of the manual drive is at rest while motive drive is taking place. The manual drive consists of a handwheel arranged on a shaft stub having a crosspin. The shaft stub is arranged so as to be axially movable and in alignment with the worm shaft of the manual drive. The worm shaft of the manual drive has, on the handwheel side, a slot which matches the crosspin.

In order to activate the manual drive, the shaft stub is displaced axially in the direction of the worm shaft by means of the hand-wheel and the crosspin is induced to engage into the slot of the stationary worm shaft as a result of the rotation of the handwheel.

Particularly where compact actuators are concerned, however, a variable-ratio planetary gear arrangement of this kind is too complicated and takes up a large amount of space.

Furthermore, DE 27 58 443 discloses a changeover device for the manual and motor operation of an actuator, in which device draw keys with coupling claws are guided in keyways of a drive column. The coupling claws breaking the operative connection between the drive motor and the drive column when the manual drive is operated. The handwheel of the manual drive is equipped with catch elements which engage into further coupling claws after the operative connection between the drive motor and the drive column has been broken. In this case, between the motor drive and the manual drive switching states, the braking action of the drive motor is lost. Moreover, the fact that the changeover device has many parts is considered a disadvantage.

In contrast to the prior art the present invention is a switching device for the manual drive of an electromotive actuator, which consists of few components and has a simple design. In the present invention which the operative connection between the drive motor and the power take-off is maintained during manual drive.

SUMMARY OF THE INVENTION

The invention proceeds from an actuator, known per se, in which an electric motor is operatively connected to a fitting by a gear. According to the features of the invention, there is provision for inserting the manual drive between the electric motor and the fitting, the existing operative connection being maintained. For this purpose, a drive shaft stub of the axially fixed drive shaft is equipped with a radial coupling pin.

The manual drive consists essentially of an axially displaceable handwheel shaft which is in alignment with the drive shaft, a handwheel being fastened to that end of the handwheel shaft which faces away from the drive shaft. That end of the handwheel shaft which is located opposite the handwheel is equipped with a coupling sleeve which is displaceable axially counter to the force of a compression spring. The end of the handwheel shaft which faces the drive shaft has at least one groove, the entrance of which is widened on both sides by means of run-on slopes. The run-on slopes are designed in such a way that, on the one hand, the axially displaceable coupling sleeve is pressed back reliably, without any selflocking, during the rotation of the drive shaft and, on the other hand, the groove of the coupling sleeve engages only when the drive shaft has a reduced rotational speed.

Furthermore, a switch inserted into the motor circuit is provided, which is closed in the state of rest of the manual drive and is open when the manual drive is activated, so that the motor is positively switched off.

By means of a compression spring, the handwheel shaft is uncoupled from the drive shaft and is held in this state of rest. This compression spring, at the same time, ensures that the drive motor can be activated again after the manual drive has been operated. In this case, the switch is closed for positive switch-off in the motor circuit.

If the motor drive is intact, the manual drive is switched off. In this case, the coupling sleeve is separated from the drive shaft. The switch in the motor circuit is closed.

When the manual drive is activated, the handwheel shaft is displaced axially in the direction of the drive shaft. In this case, the switch in the motor circuit is opened and the motor is thereby positively switched off. As a result of the axial displacement of the handwheel shaft, the coupling sleeve approaches the drive shaft stub, until the coupling pin brushes over the end face of the coupling sleeve. When the axial movement of the handwheel shaft is continued, the compression spring is tensioned.

Insofar as the drive motor is at a standstill, as a result of further axial displacement of the handwheel shaft and additional rotation, the coupling pin of the drive shaft is brought into engagement with the groove of the coupling sleeve, thereby relaxing the compression spring. The manual drive is consequently ready for operation.

Insofar as the drive motor is switched off as a result of the opening of the switch in the motor circuit due to the axial movement of the handwheel shaft when the manual drive is actuated, the drive shaft, which has a moment of inertia, first continues to rotate. In this case, the coupling pin brushes over the end face of the coupling sleeve. When the groove is reached, the moved coupling pin impinges onto the run-on slope located in the direction of rotation. At the same time, the coupling sleeve, which projects due to the partial relaxation of the compression spring, is pressed back into the original position. After the kinetic energy of the drive shaft has been reduced, the coupling sleeve engages, with the groove located on its end face, on the coupling pin in the drive shaft. The manual drive is ready for operation and for exerting a permanently acting axial handwheel force component.

After the axial handwheel force component has been canceled, the compression spring displaces the manual drive back into the position of rest. The manual drive is uncoupled and the switch in the motor circuit is closed.

Advantageously, a switching device of this kind can be produced with few components which are technically simple. Furthermore, the switching device is very space-saving and thus contributes to the compact design of actuators.

DESCRIPTION OF THE PREFERRED EMBODIMENT(S)

Figure 1:
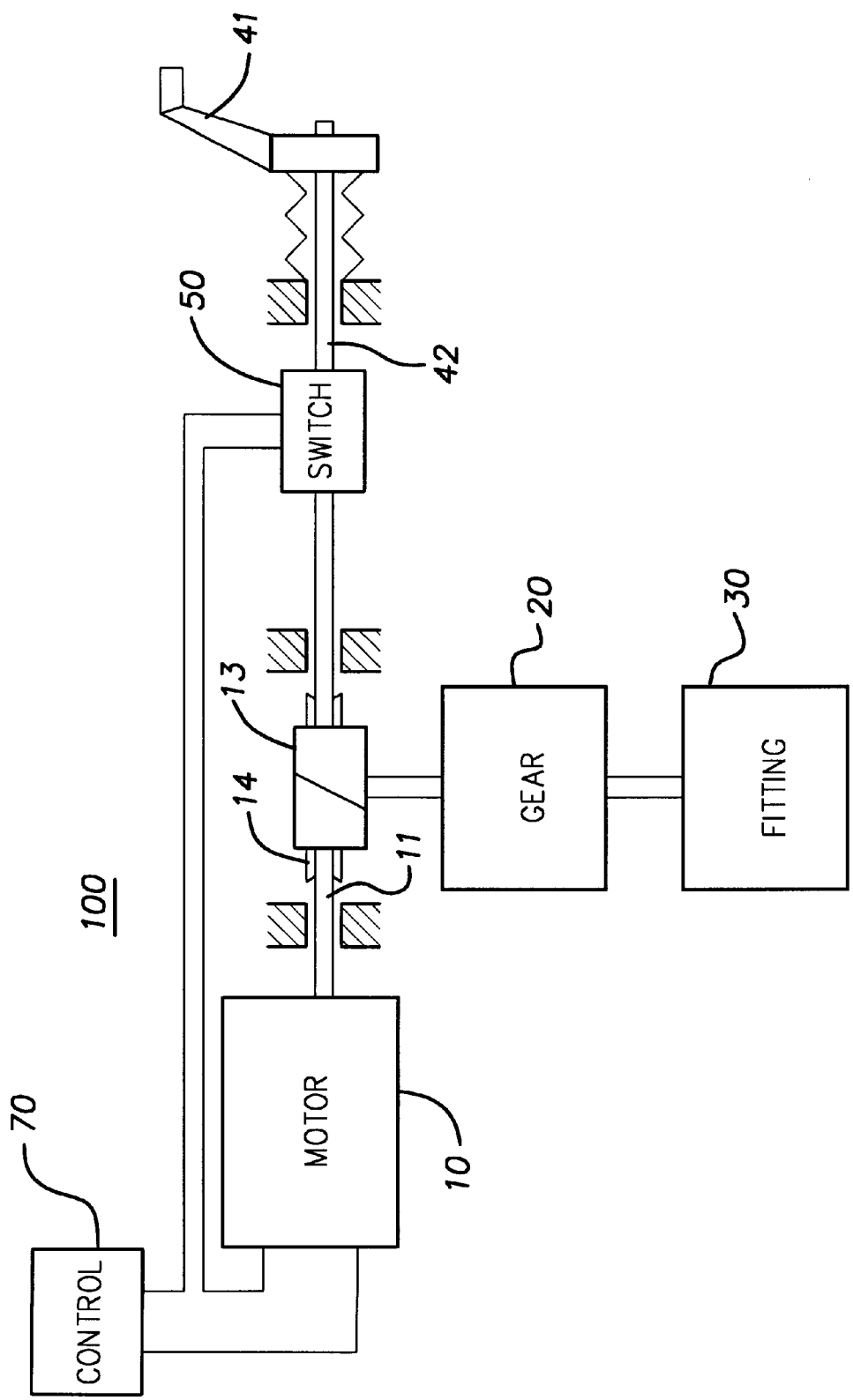
FIG. 1 shows a block diagram of an actuator.

Referring now to FIG. 1, there is shown an actuator 100 which consists of an electric motor 10 which is operatively connected to a fitting 30 via a gear 20. The electric motor 10 is connected to a control 70, from which the electric motor 10 is supplied. The electric motor 10 has a drive shaft 11 which is connected to the gear 20 via a drive worm 13 and a worm wheel 14. Furthermore, the actuator 100 has a manual drive which consists essentially of an axially displaceable handwheel shaft 42 which is in alignment with the drive shaft 11 of the electric motor 10, the handwheel 41 being fastened to that end of the handwheel shaft which faces away from the drive shaft 11. That end of the handwheel shaft 42 which is located opposite the handwheel 41 is equipped with a switching device 50 which is suitable for making an operative connection between the handwheel shaft 42 of the manual drive and the drive shaft 11 of the electric motor 10.

Figure 2:
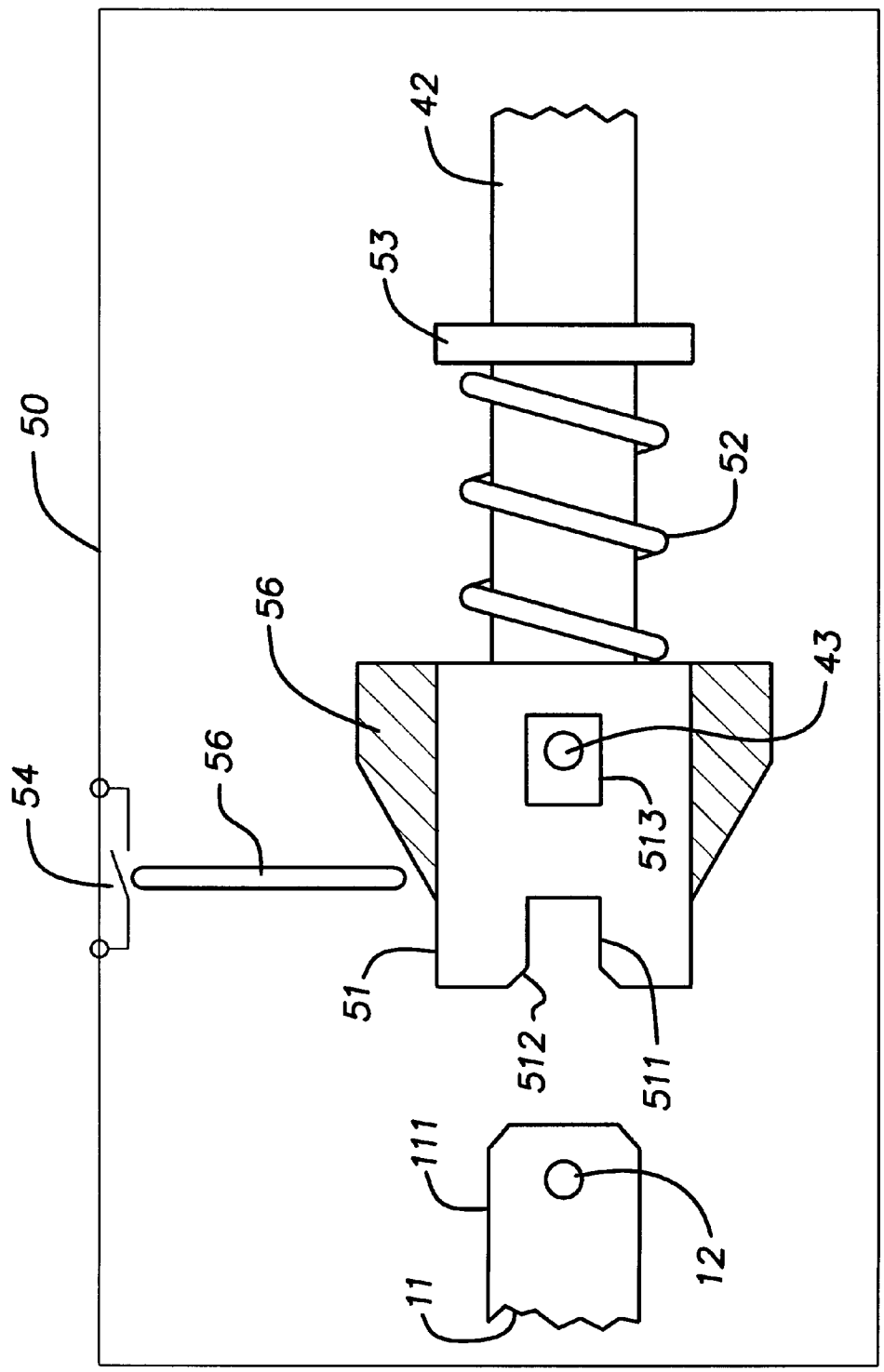
FIG. 2 shows an illustration of the switching device with the mechanically controlled positive motor switch-off.

The switching device 50 is illustrated in detail in a first embodiment in FIG. 2. A drive shaft stub 111 of the drive shaft 11 is equipped with a radial coupling pin 12. The drive shaft 11 is axially fixed. The handwheel shaft 42 is equipped with a coupling sleeve 51 which is displaceable axially counter to the force of a compression spring 52. The end face of shaft 42 which faces the drive shaft 11 has at least one groove 511, the entrance of which is widened on both sides by means of run-on slopes 512.

Furthermore, a switch 54 inserted into the motor circuit is provided. Switch 54 is closed in the state of rest of the manual drive and is opened when the manual drive is activated. The switch 54 is operated by operating means.

In a first embodiment, the operating means is formed by an annular body 55 which is arranged on the circumference of the coupling sleeve 51 and is provided with a run-on slope. The run-on slope operates the switch 54 by a switching tappet 56, as soon as the handwheel shaft 42 is displaced axially in the direction of the drive shaft 11. The compression spring 52 is supported against a thrust plate 53 which is firmly connected to the handwheel shaft 42.

In a further design of the invention, for the displaceable mounting of the coupling sleeve 51, there is provision for equipping the handwheel shaft 52 with a catch pin 43 which engages into axial slots 513 of the coupling sleeve 51.

Figure 3:
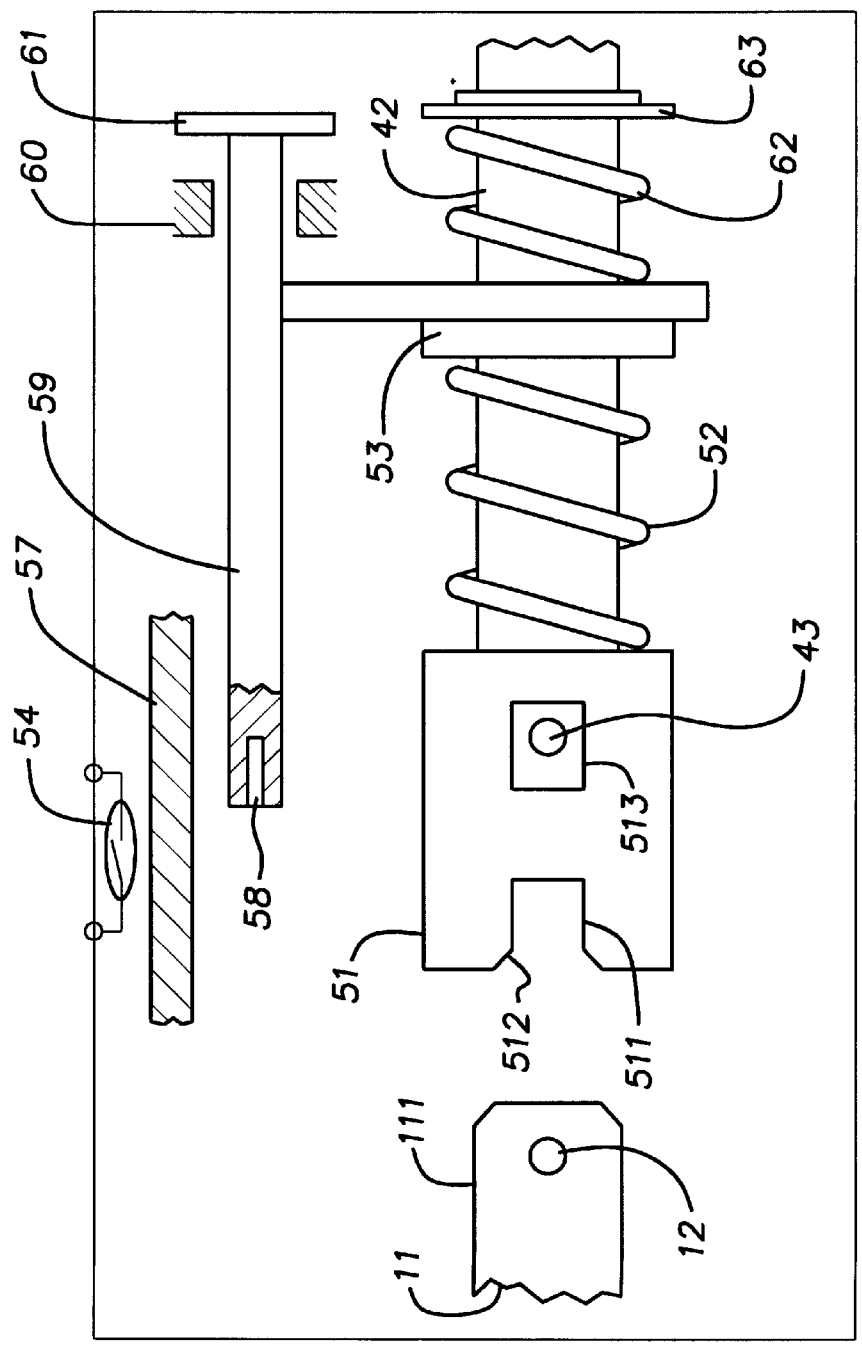
FIG. 3 shows an illustration of the switching device with magnetically controlled positive motor switch-off.

FIG. 3 illustrates a second embodiment of the invention, using the same reference symbols for identical elements. In this case, the switch 54 for the positive switch-off of the motor is arranged outside the gear compartment and is separated from the switching device 50 by a nonmagnetic housing wall 57.

The switch 54 is designed as a reed contact and is operated by a permanent magnet 58. For this purpose, a mount 59 is provided, which is mounted displaceably in a guide 60. Furthermore, the mount 59 is connected to the handwheel shaft 42 in such a way that, during the axial displacement of the handwheel shaft 42, the mount 59 is first taken up over a particular distance, until a stop 61 butts onto the guide 60, said mount remaining in this position. At the same time, the reed contact 54 is operated through the housing wall. During the further axial displacement of the handwheel shaft 42, the mount 59 is retained in position by means of a spring 62 supported against a thrust ring 63. In this case, the displacement travels are dimensioned in such a way that the reed contact 54 is operated first, before the coupling sleeve 51 reaches the drive shaft stub 111.

Expediently, the reed contact 54 is connected to the control 70 by an auxiliary circuit in such a way that, with respect to the reed contact 54, the positive switch-off of the motor 10 is carried out indirectly by means of a switch in the control 70. Advantageously, the electric switching compartment of a switching device designed in this way can be encased in a hermetically sealed manner, so that explosion protection requirements are satisfied.

Figure 4:
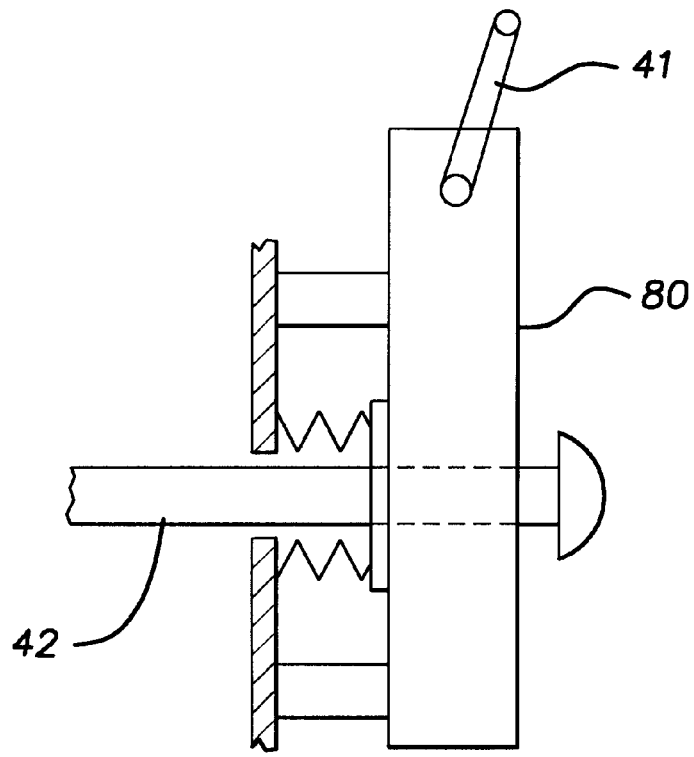
FIG. 4 shows an illustration of a manual drive with preliminary gear.

In a further embodiment of the invention, according to FIG. 4, a preliminary gear 80 is provided with a hollow shaft which is located on the power take-off side and in which the handwheel shaft 42 is guided axially displaceably and also guided in rotation. The handwheel shaft 42 is designed as a splined shaft in the region of the hollow shaft.

Advantageously, the preliminary gear 80 brings about a reduction in the handwheel force. Furthermore, there is no need for the simultaneous application of an axial and a radial handwheel force component on the handwheel 41 in order to operate the manual drive. Moreover, the preliminary gear 80 may advantageously be used for reversing the direction of rotation of the handwheel.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A switching device for the manual drive of an electromotive actuator having an electric motor operatively connected to a fitting by a gear and with an axially fixed drive shaft and having a manual drive which comprises a handwheel shaft and a handwheel and which can be operatively connected to the fitting, wherein, a drive shaft stub of said axially fixed drive shaft is equipped with a radial coupling pin;

said handwheel shaft is mounted axially displaceably and in alignment with said drive shaft;

that end of said handwheel shaft which is located opposite said handwheel is equipped with a coupling sleeve displaceable axially counter to the force of a compression spring;

that end of said coupling sleeve which faces said drive shaft has at least one groove, the entrance of which is widened on both sides by means of run-on slopes; and said manual drive has means for operating an electric switch which is arranged in a circuit of a drive motor, said electric switch closed when said manual drive is in a state and opened when said handwheel shaft is engaged.

2. The switching device as claimed in claim 1, wherein said handwheel shaft is equipped with a catch pin which engages into axial slots of said coupling sleeve.

3. The switching device as claimed in claim 1, wherein said means for operating an electric switch (54) is designed as an annular body, arranged around said coupling sleeve and provided with a run-on cone, and a switching tappet running onto said annular body.

4. The switching device as claimed in claim 1, wherein said means for operating an electric switch is designed as a reed contact which is operated by a permanent magnet guided on a mount.

5. The switching device as claimed in claim 4, wherein said reed contact is separated from said permanent magnet by a nonmagnetic housing wall.

6. The switching device as claimed in claim 1, wherein said handwheel shaft is preceded by a preliminary gear having a hollow shaft which is located on that side of said preliminary gear which faces said coupling sleeve and in which said handwheel shaft is guided axially displaceably and is also guided in rotation.

* * * * *